INVENTOR.
Donald E. Marshall
BY
Attorney

INVENTOR.
Donald E. Marshall

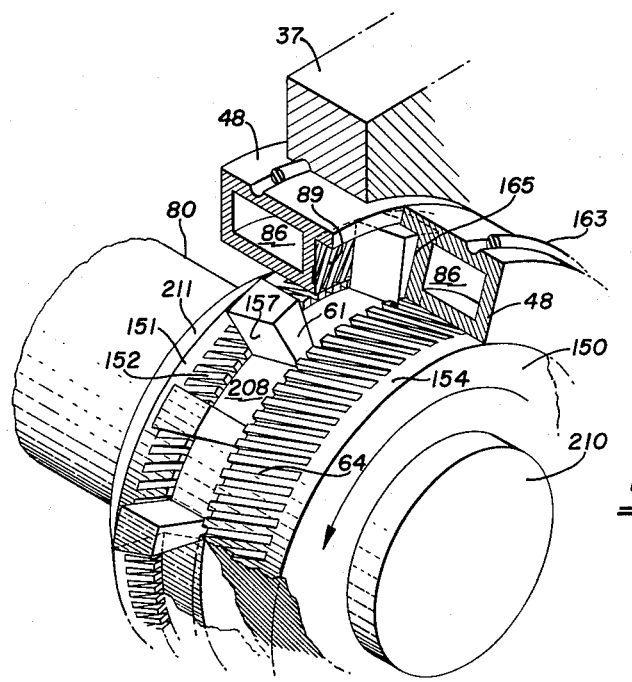
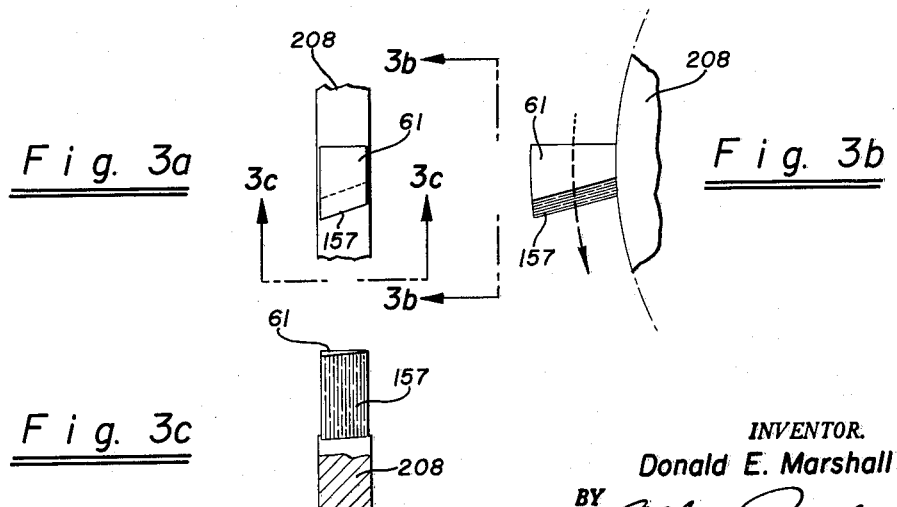
INVENTOR.
Donald E. Marshall
BY
Attorney

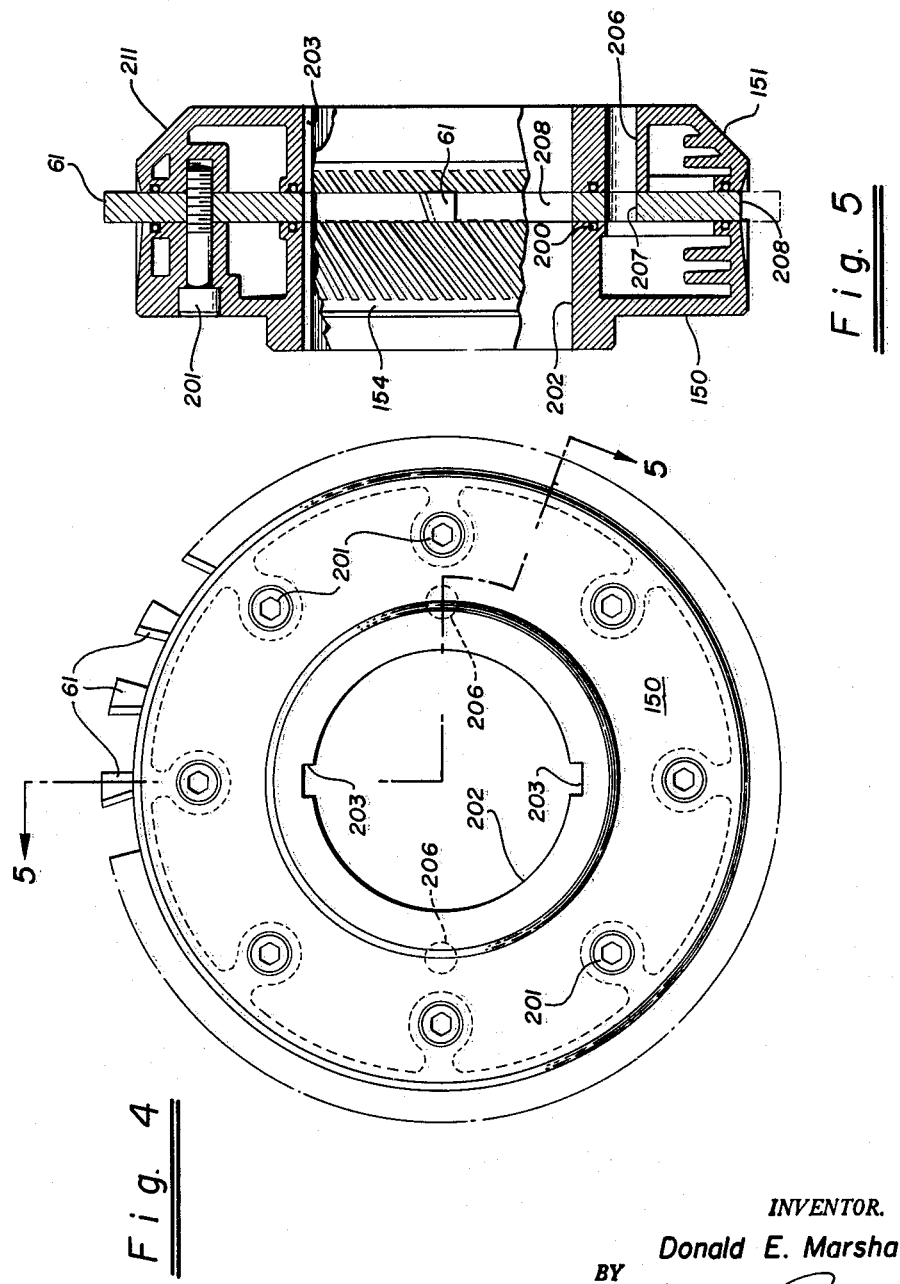

3,153,688
METHOD AND APPARATUS FOR INTENSIFIED REFINING OF DEFORMABLE SOLIDS
Donald E. Marshall, 4904 Sunnyside Road, Minneapolis, Minn.
Filed June 20, 1961, Ser. No. 118,334
7 Claims. (Cl. 264—349)

This invention relates to the refining and milling of materials in the solid state. It has hitherto been impossible to accomplish this to any appreciable degree of intensity with methods and apparatus now in use.

My previous inventions dealing with film-milling, such as those covered by U.S. Patents Re. 23,760 and 2,723,422 covering methods and apparatus for refining viscous materials, still left the problem of satisfactorily handling materials which were solid though deformable at the time of processing.

The present invention deals, among other things, with combining the feeding function with the milling function so as to gain nearly perfect adaptability to the material to be processed; to greatly improve the temperature control so that lower finished product discharge temperatures, down to and including below solidifying may be reached; to gain a pressure discharged extruding mill for gas-tight blending of adhesives and plastic foams; to minimize the amount of resident material or hold-up to less than 0.01 percent of the hourly throughput; to facilitate replacement of all internal mill and feeder parts for cleaning, sterilizing, and for the economical handling of abrasive materials by using expendable parts; and to gain greater milling yield per unit of power by greatly increasing the milling effectiveness and other advantages explained in this specification.

To film-mill or mechanically refine any deformable material in the solidified state requires precise flow control for each characteristic material. Choosing the proper rotor surface contours and rotor-pump capacity to direct flows effectively through the film-mill is an engineering problem of adaptation very much like choosing the proper saw blade or tooth design and tooth setting for each material to be sawed most effectively. Therefore, the inherent facility for changing the working parts becomes a very important discovery in adaptability. Machinery designed for blending rubber, etc., is usually, like the dinosaur, of a low adaptability because of its enormous size and the forces generated to make it operate. As a result, many compromises to the machine must be made at the loss of product perfection.

In the original film-mill the material was hydraulically forced circumferentially around the stator, then radially through the feed-slot into the rotor grooves, where the rotor action propelled the material axially as a film-like sheet across the close-fitting and flat miling zone in a spiral pattern.

Many materials with poor flowing properties, such as rubber, chocolate, pigments, and stiff plastics in a heavy dough state, require prohibitive hydraulic feed pressures to make them flow through the types of refining apparatus now in use, including the original film-mill.

It is therefore an object of my invention to provide a method and apparatus for mechanically refining and milling of solid materials incapable of being so processed at present.

It is another object of my invention to provide a method and apparatus which will be capable of mechanically refining deformable solids to a degree not hitherto possible.

It is still another object of my invention provide a method and apparatus which will permit more effective film-miling of materials.

It is yet another object of my invention to provide a method and apparatus for milling solid materials to a high degree of intensity while at the same time providing for mixing, blending, gassifying, deaerating and other related operations.

It is an important object of my invention to provide an apparatus for milling solid deformable material which will be versatile and flexible and capable of being readily modified and adapted to materials having many different properties.

It is another important object of my invention to provide a method and apparatus for refining deformable solids which will so combine the functions of feeding and milling as to achieve results hitherto unattainable.

It is a more specific object of my invention to provide a method and apparatus for intensified refining of deformable solids which will utilize the action of helical feeding and extruding means to propel such solids axially into the milling zone of a film-mill.

Other objects of my invention will be evident to those skilled in the art from the description which follows.

I have discovered that the combining of a mill rotor having axial feed grooves with a circumferential feed distributing impeller has removed a basic limitation formerly inherent in film-mills.

I have discovered further that impeller-like radial teeth of a rotor, operating as a pump within a tunnel-like casing, the latter being integral with the inner circumference of a stator, carries, propels, and pumps small segmented ropes or pieces of the material presented to the feed zone of this rotor pump or feeder. These segments or pieces of fed material are carried mechanically around the stator's inner circumference, contrasted to being forced hydraulically around this path.

Consequently, a principle similar to that of the film-mill, which is to mill or mechanically refine by shearing only thin films of stiff material to gain a high level of effectiveness and efficient use of power, may be used to perform the feeding function by means of this invention. That is to say, small increments of input material are carried around to some starved point in the circumferential feed tunnel or slot, where an opening in the tunnel serves to introduce the material to the feed grooves. This invention avoids wasting consequential amounts of power on developing hydraulic flow and in the braking action on the rotor due to exposure of the rotor surface to this high hydraulic pressure of the feeder, this pressure being no longer required. With poor flowing materials, this hydraulic feed pressure becomes prohibitively high, causing excessive heat and waste of power without contributing importantly to the close-fitting milling action between the rotor and stator, which does the important film refinement work.

The present invention furthermore provides a milling device of great flexibility and effectiveness which handles abrasive or corrosive materials with exposure of only the expendable parts which make up the rotor surface, the stator ring or liner surfaces, and the rotor pump or feeder impellers. Therefore, maintenance on the film-mill may be reduced to the equivalent of replacing cutting tools or saw blades. These easily examined and replaceable wear parts also provide easy access to inside surfaces of the film-mill so that the interior may be cleaned or even stripped and set aside for use and re-use on only a specific material. On edible products like ice cream, the parts may be removed and sterilized at the end of each run. The simplicity of design is such that very hard metals or impervious coatings may be applied to the interior parts exposed to milling abrasion.

By combining such a rotor-pump with a film-mill in the manner of this invention, a great improvement is gained for closely coupled multistage operation without any opportunity for segregation in processing material or loss of aeration to occur between stages.

The present invention lends itself also to gas-tight operation and yet has adjustability for alignment of rotor within the stator so as to maintain with ease, perfectly uniform milling clearances measured to one-thousandth of an inch.

This invention also removes previous limitations on the diameter of the milling zone, and this is very important as will be explained.

An understanding of this invention may be had from the description of one embodiment and from the method of operation which follows and from the accompanying drawings of which:

FIG. 1 is a cut-away side elevation partly in section of a horizontally fed mill.

FIG. 1–a is a section through the removable stator rings or casing liners of FIG. 1.

FIG. 3 is a cut-away perspective, partly in section, showing relationship of feed distributing impeller, annular slot or tunnel casing, helical extruder grooves, and milling zone.

Figure 1:
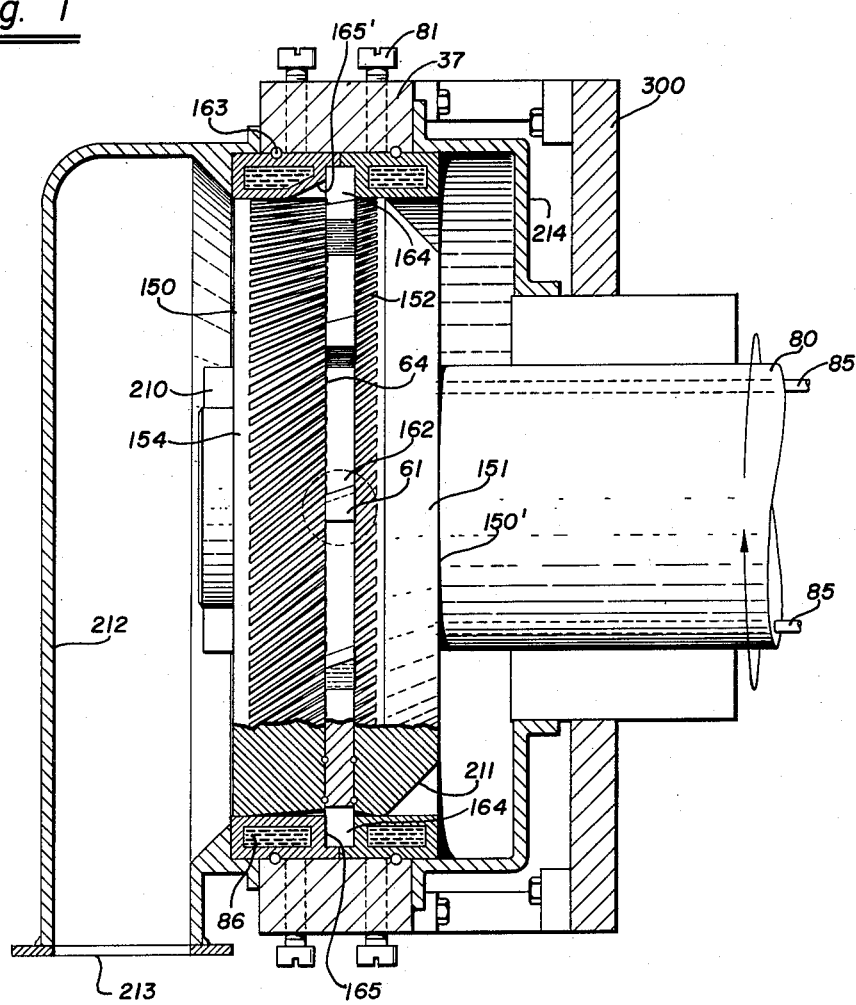
Figure 1A:
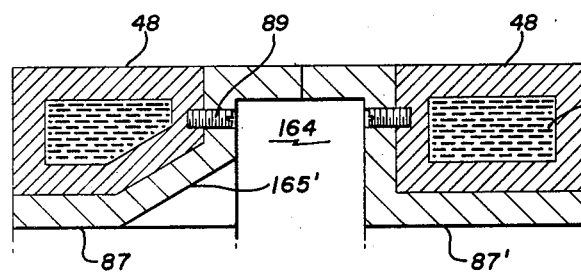

FIGS. 3–a, 3–b, and 3–c are various views of the radial teeth of the feeder impeller.

FIG. 4 is a side elevation of the feeder impeller.

FIG. 5 is a partial cross-section through a mill showing method of assembly and coolant circulation.

Referring now to the drawings in general in which like parts are identified by the same number in each figure, it will be seen that the method of this invention comprises forming the material to be milled into a segmented rope or pieces of equivalent volume to the discharged sheet; mechanically distributing these pieces or segments to a unique helical extruder formed by the very short flights or helical teeth in the rotor between the grooves 64 and the stationary stator rings 48; rotating the rotor at a speed sufficient to generate a worm and barrel feeding action which picks up the preformed feed and extrudes it through a close-fitting (.002–.020 in.) but very short flat milling zone 154, between rotor outer surface and stator-ring inner surface as an extremely film-like sheet moving axially; and while it extrudes, imparting to the inner and outer surface layer a shearing action at a speed high enough to effect subdivision and compacting of the particles in the sheet and throughout its mass. Naturally, this new film-mill may also be operated under higher feed pressure to gain special results, such as greater throughput, but the basic difference is that greater efficiency and lower temperatures may be attained without force feeding.

Referring now more particularly to the drawings, which illustrate one type of apparatus embodying the principles of this invention, FIGS. 1 through 5 show the preferred form of the apparatus. As here shown, the apparatus comprises a frame 300 supporting a shaft 80 and a stator frame 37. An input port 162 in frame 37 may be arranged for horizontal feeding as shown in FIG. 1 or for vertical feeding as shown at 162' in FIG. 2.

Figure 2:
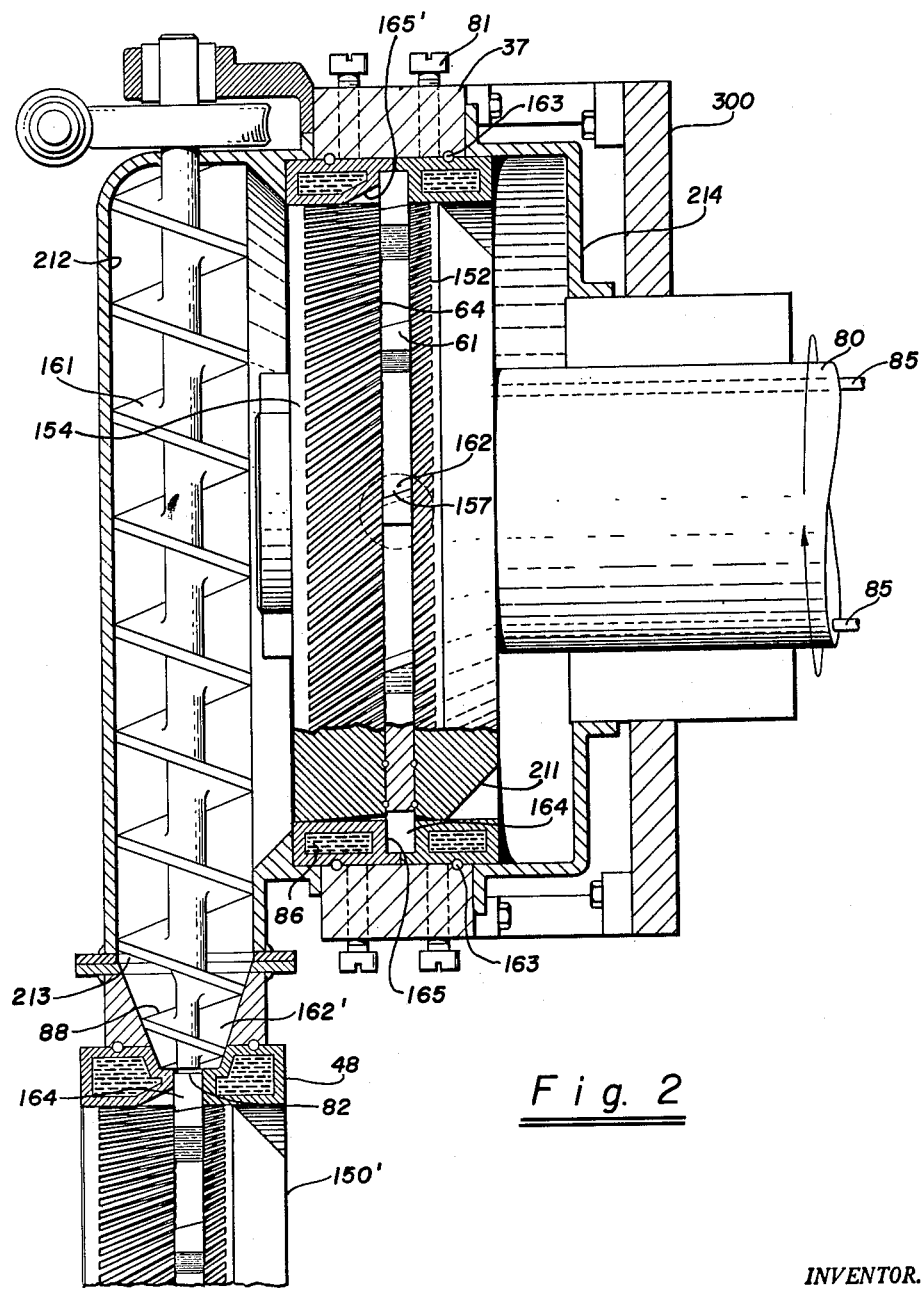
FIG. 2 is a cut-away side elevation, partly in section, of a two-stage arrangement embodying a vertical worm.

Input material may be pelleted so as to feed by gravity into the vertical port 162' or be wormed into either a horizontal port 162' or a vertical port 162' as shown in FIG. 2 by worm 161.

Where the port 162 joins the removable stator-rings 48, which are mounted to stator frame 37 on centering jackscrews 81 and sealed by flexible O rings 163, an entrance opening 82 in tunnel 164, formed on stator-rings 48 by the joining of two L-shaped edges of the inboard and outboard stator-rings, allows feed to enter the impeller space between teeth 61 which, for example, may be a space 1 inch wide by 1 inch deep and 1 inch long (measured around the circumference of the rotor) mounted and keyed to the shaft 80.

The shape given to the edges of the stator-rings 48 at this port 162 may be altered to give more or less opening to the mill rotor 150' so that by changing the stator-rings 48 to suit the particular application this access port may be made suitable to those particular needs.

The rotor 150' is constructed as shown in FIGS. 4 and 5. The cylindrical cups, 150 outside comprising an extruding section of helical grooves 64 and a cylindrical milling zone 154, and 151 inside comprising a sealing section of helical grooves 152, are cast with suitable wall design as shown. Between cups 150 and 151 is clamped the circular impeller plate 208 from which impellers 61 are extended. The assembly is sealed with O rings 200 and bolted together with sunken cap screws 201, thus forming a hollow rotor with hub 202 which is keyed to the shaft 80 by key-and-key slot 203. Coolant input from the shaft coolant tubes 85 connected to a running seal, not shown, join rotor ports 206 so as to circulate coolant through the inner cup 151 across plate 208 through port 207 through outer cup 150 and out port 206 to the shaft coolant tubes 85.

Distributing impeller teeth 61 run in the open section of tunnel 164 for a short arc, the diameter of feed port 162 carrying the material lodged between impeller teeth 61 into the closed section of tunnel 164.

The wall 165 of outside stator-ring 48 may be at 90 degree angle with rotor grooved surface as shown at bottom of FIG. 1 or may be relieved to be at a 30 degree angle as shown at 165'. The drag of material carried along tunnel 164 will cause input material to slip off the tapered front face 157 of impeller teeth 61 and move axially in grooves 64. This axial feed may be augmented by the amount of relief given to face 165' of tunnel 164. In this way, the short worm and barrel action of rotor grooves 64 will generate axial flow of input material as a sheet moving axially into and through the flat milling zone 154. Of course, like all worm and barrel extruder action, there is spillage over the flights and out of the helical grooves circumferentially to some extent, possibly 10 percent. This tends to distribute the axial feed evenly around the full 360 degrees of rotor 150' and does very useful mixing and refining in the groove section 64 of the rotor. The tunnel 164 wall surfaces may be lightly grooved 89, as shown in FIG. 3.

On the inboard side of stator and rotor, the worm and barrel extruder action of grooves 152 serves primarily as a running seal to prevent discharge on the inboard side when that is not wanted, such as when handling sticky materials like plastics.

On non-sticky discharged materials, both outboard and inboard delivery from the rotor may be desired. Inboard cup 151 would then be given a worm pitch on its cylindrical surface so that feed would divide and flow axially in opposite directions as described in U.S. Patent No. 2,723,422. In such an arrangement the grooves 152 on cup 151 being slanted in the direction opposite to grooves 64, comprise a second or additional extruding means.

Stator-rings 48 are cast with coolant chamber 86 and pipe connections in and out for coolant 85. Chamber 86 and suitable stationary pipe connections in and out for coolant not shown.

Micrometer adjustment for centering the stator-rings with the rotor is made possible by adjusting screws 81 suitably spaced to hold the stator-rings 48 firmly against mill torque as well as centering by having an adjustment space of 1/64 inch around the inner circumference of stator frame 37. Large circumference O rings made of high temperature proof resilient plastics serve to make this 1/64 inch clearance gas-tight.

When changing rotors to a suitable clearance and design for a specific material to be processed, nut 210 is removed, then outboard stator-ring 48 is removed so that impellers 61 will be free to move axially away from stator frame 37. Also, with the rotor removed, the inboard stator-ring may be slid out axially.

FIG. 1-a illustrates how stator-rings 48 may be designed with replaceable liners 87 and 87'. These liners may be sweated with solder to stator-rings 48 so as to improve the heat transfer. These liners are fastened with sunken cap screws 89 to the rings 48 at several points around the circumference. By removing outer ring 48 the inner ring liner 87' may be replaced when rotor is removed from shaft 80.

The beveled edge of rotor 211 illustrates how the braking action of the inboard cup 151 may be minimized. This same treatment may be used on the outboard cup 150 when a minimum of milling is desired, in contrast to the wide flat milling zone 154 shown in FIG. 1.

Material with poor gravity flow when discharged from the mill into chamber 212 may require a mechanically driven screw 161 terminating in a circular pipe outlet 213. This same discharge system may be equipped with a feeder screw extension 88 shown in FIG. 2, so that the material may be worm fed directly into the feed port 162' of a second stage-film-mill.

When the upper film-mill is removed, a hopper, not shown, may be fitted to this feeder so as to make it serve as a vertical feed hopper to a vertically fed input port 162'.

An inboard chamber 214 is mounted so that a gas-tight seal in the main bearing will make the inboard side of the mill gas proof as well as the outboard chamber 212.

Two-stage operation may be required to gain absolute uniformity in mixture of liquids with chemical doughs or gases. Such transient material may first be metered into the stator tunnel 164 but, because less than a pound of material is held up in a 15 inch diameter film-mill, the correct proportioning may be difficult in the first stage. However, by running the discharge chamber full and airtight this uniformity will be accomplished in the second stage.

Some of the operating characteristics of this invention are now set out. The amount of material within the film-mill during operation, or upon stopping to clean out for a long shut-down or to avoid contamination between runs has been greatly reduced. Only $\frac{1}{18}$ the resident material stays within, compared to the original film-mill, which already held a relatively small amount compared to the hourly throughput.

For example:

Original film-mill (Patent 2,723,422): 2000–3000 lbs. per hour capacity.
Resident material: 18.0 pounds or 0.6–0.9%.
Film-mill of this invention: 2000–3000 pounds per hour capacity.
Resident material: 1.0 pound or 0.04–0.05%.

The minimizing of resident material is of great importance when handling material which must then be degraded or when dealing with explosive mixtures such as solid rocket fuels.

Minimum resident material in the film-mill also insures against having dead or inactive spaces within the mill where a segregation of two different materials could occur. This becomes important when coalescing modifiers with plastics or controlling degrees of aeration in plastic foams.

A sample calculation of factors governing the capacity of the present film-mill will help to clarify its functioning. Assume:

(1) Rotor outside diameter of 15.25 inches (circumference 48 inches).
(2) Shearing zone 2 inches (measured axially) on the discharge side of rotor only.
(3) Rotor pump impellers: 1 inch (axially) x 1 inch (radially) x 1 inch (circumferentially). Conveyor space between impellers: 1 inch (circumferentially). Aggregate spaces between impellers: 24 cubic inches.
(4) Pump efficiency 75 percent: Effective Load—18 cubic inches per rotor revolution.
(5) Material density: 50 pounds per cubic foot. Pumped material per revolution: 0.522 pounds.
(6) The pump capacity at various rates will be:

| Shear Rate, f.p.m. | Speed Revolutions, r.p.m. | Output Capacity, lbs. per hr. (25×0.522 ×60) |
|---|---|---|
| 100 | 25 | 780 |
| 200 | 50 | 1,560 |
| 300 | 75 | 2,340 |
| 400 | 100 | 3,120 |
| 500 | 125 | 3,900 |

(7) It has been determined by laboratory tests that a 30 inch circumference film-mill at 300-f.p.m. shear rate will have a worm and barrel extrusion effect or axial flow action across a 2 inch wide groove and milling zone transports an .008-inch thick sheet of milled soap at an axial rate of 2.8 miles per hour or about 250 feet per minute.

Therefore, this worm and barrel extrusion effect at 300 f.p.m. shear rate on the assumed 48 inch circumference film-mill would discharge the sheet at the following rate:

speed   circumference   clearance   volume $$250 \times \frac{48}{12} \times \frac{.008}{12} = .666 \text{ cu.ft./min.}$$

This is a rate of 40 cubic ft./hr. which with a material of 50 pounds per cubic foot is an extrusion rate of 2000 pounds per hour.

(8) So that in this case the rotor-impeller feeds 2340 pounds per hour to the grooves and the worm and barrel extruder discharges 2000 pounds per hour at 300 f.p.m. shear or 75 r.p.m. of the rotor. This provides a proper amount of over feed to prevent cavitation in the grooves of the rotor.

The limiting factor on heat transfer is not the transfer of heat from the material being milled to the rotor and stator (which are in turbulent contact) but from the rotor and stator to the internal coolant which is inhibited by the skin effect of the slower moving coolant. The cooling is therefore a function of the area of rotor and stator which is in contact with the coolant, which is proportional to the square of the diameter of the rotor.

Capacity is directly proportional to the circumferential dimension of the extruded sheet of material being discharged from the very minute milling zone clearance, which may be 0.008 inch. Thus the capacity is proportional to the diameter, providing the flow rate across the milling zone is maintained.

Shearing rate, in terms of ft.-per min. at the rotor surface, is increased directly in proportion to the increased diameter.

The advantages of this invention should now be evident to those skilled in the art and the principal ones are set forth below.

The present invention provides a sophisticated mechanical design whereby all functions of a film-mill may be altered to suit the product need with facility and minor expense compared to prior methods:

(1) Feed distributing impellers may be varied in number of impellers per circumferential distance and by changing the axial width of impeller to gain desired feed rate at any preferred shearing rate.

(2) The diameter of the rotor may be varied over a wide range of sizes without altering the efficiency and adequacy of the integral distributing and feeding pump action developed by impellers and the circular distribution tunnel. A 15 inch diameter at 75 horsepower or a 30 inch diameter at 150 horsepower will be properly and effectively fed to insure uniform and full milling zone action.

(3) Complete deaeration of discharged product may be attained by overfeeding at the input port so as to force back all air pockets out the feed hopper. Also, a vent may be used in the feed zone or annular tunnel.

(4) Controlled aeration of discharged product may be attained by controlled underfeeding and supplying voids in the distribution tunnel with input of air or gases from an outside source.

(5) Clearance between rotor-impellers and stator-ring tunnel may be regulated by changing edge conformation of the replaceable stator-rings or liners.

(6) Travel distance through milling zone may be minimized by choosing a rotor having a very narrow extruder and milling zone. The outboard portion of the rotor not being used may be tapered off to render it ineffective.

(7) Milling clearance may be varied most conveniently by changing rotors of varying diameters.

(8) On any given material, an optimum shearing rate may be found by trial and error. Once this shear rate is known, the proper pitch and depth of grooves in the rotor may be determined to yield the maximum extrusion rate at the chosen shearing rate. This is similar to choosing a proper propeller pitch on an outboard motor to suit the speed and load of the boat.

(9) Should the film-mill freeze on operation or on standing, it is a simple matter to free it by removing the outboard stator-ring with a tire puller tool to expose and free the jam.

All of these methods of adaptation are made possible by holding to the principle of working only on small increments of throughput material at a time. All of the intensity of 1000 H.P. mixers may be generated in a 75 H.P. film-mill. And, because of its small size, every detail which yields a better product may be attended to by mechanical adjustment not possible with large extruder and Banbury batch mixers.

Many other advantages of this invention will now be evident to those skilled in the art. For example, in the processing of ice cream, the conventional continuous freezer relies upon some 25 percent of unfrozen liquid to keep the mixture pumpable. To completely freeze the mixture in the present apparatus and thereby gain mechanical crystal refinement and then discharge a completely frozen stable product opens the way to great improvement in ice cream texture, when the present film-mill is used as a continuous crystallizer. Another example would be in adhesives, where a certain high viscosity is needed in the finished product to gain immediate bonding and where the use of unstable plasticizers must be minimized. The present film-mill has the necessary shearing power operating on thin films to gain the finished product characteristics including aeration without limitations imposed by the unsuitablity of the machine. Whatever speed of shear, milling clearance, temperature control, viscosity, etc., desired by the process engineer may be provided without mechanical limitations such as the pump pressure limitations of the original film-mill, or diameter of rotor limitations, or inability to handle very abrasive mixtures. Neither are there limitations in the present film-mill on temperatures, high or low.

In the case of ice cream operation, now that no reasonable limitation is placed on the diameter of the rotor and stator-rings, sufficient metal is at hand both to gain enough surface at the interface between coolant and rotor interior but also thick enough metal walls may be cast to conduct heat through the metal walls of the rotor, away from the active milling zone. Below freezing operation on ice cream would be done at slower revolution and across a narrow flat milling zone so as not to melt the material locally due to pressures lowering the melting point of the in-process material. Yet at such close clearances as .008 inch, no coatings can accumulate on the heat exchange surfaces in contact with the throughput material. Unlike the votator or ice cream machine, no scrapers are needed.

Tramp materials in the feed, such as bolts or nuts dropped into the feed, may be screened by using grids at the input port. Such material might also be carried around by distributing impellers and rejected at each feed port to grooves where the trailing edge of feed port is pitched to cause rejection back into the feed tunnel.

Actually, due to the close-fitting milling zone, no tramp material larger than this clearance may be drawn in. Unlike a pair of roller mills, there is no "bite" since the surfaces are moving crosswise to the material flow direction. Tramp material may be carried around and around by the impeller and never get to the rotor grooves, or it may, if small enough, reside in the groove until clean out time; but never does it wedge into the space between the flat milling surfaces.

Many other advantages and applications of the present invention will be evident to those skilled in the art from the description I have given.

While I have shown a preferred embodiment of my invention, it is understood that many variations may be made without departing from the spirit of my invention, and I do not hereby limit myself in scope except as I do so in the claims.

I claim:

1. A milling method for dough-like and shearable solid materials characterized by passing a thin layer of said material across a narrow attrition zone bounded by closely spaced, parallel heat transfer surfaces of substantial area; one surface having fast motion in a fixed direction relative to the other, stationary bounding surface; the contours on said surfaces inducing a cross-flow of said thin layer of through-put material; the material being introduced to said attrition zone by presenting it to carrier grooves forming contours in the central portion of said moving surface and being carried by these grooves in said fixed direction; said material being induced to flow across and out from the said central portion by fine corrugations on both the said moving and stationary surfaces which are pitched at an angle in relation to each other; the thin layer of through-put material being on the order of from .004 inch to .016 inch thick; the relative motion of said surfaces being on the order of from 500 feet per minute to 2,000 feet per minute; the cross-flow rate of the layer being on the order of from 200 feet per minute to 1,000 feet per minute; the ratio of the cross-flow path distance to the distance said material is carried by said grooves being on the order of from 1:15 to 1:26, whereby said thinness of material layer, attrition of said layer against heat-transfer surfaces of substantial area, speed of relative motion of said bounding surfaces, consistency of said layer, ratios of cross-flow to carried distances, comprise a mechanical milling method of great effectiveness.

2. The method of claim 1 further characterized by said moving surface being the narrow rim of a cylindrical rotor, turning within a mating stator's inner surface to form said attrition zone; said stator having input ports communicating with grooves forming pitched contours on the central portion of said rotor rim surface to feed and to carry material around the circumference of said stationary surface; corrugations on said rim and said stator mating surfaces having a relative angular pitch serving to induce a cross-flow from said central portion through and out the circumferential edge of said rotor whereby said thin layer of material is induced to pass rapidly through said attrition zone, and across heat-exchange surfaces having a significant regulating effect on the temperature of said thin layer.

3. The method of claim 2 further characterized by multiplying the heat-conducting paths between the said rim surface and the interior surfaces of the rotor by means of having several rim sections dividing the rim's axial width; each rim section integral with a supporting wall forming disc-like end walls of said cylindrical rotor, so that the heat flow to and from said rim surface, forming the moving bounding surface of said attrition zone, is conducted radially through said disc-like metal conductors; said multiple system of conductors providing a greatly extendable inner rotor surface for exposure to a heat-exchange medium from an outside source; whereby said surface extension system multiplies proportionally as the ratio of the rim axial width to rotor diameter increases from 1:4 to 1:10.

4. The method of claim 2 further characterized by arranging said rotor grooves and corrugations in a herringbone pattern so that a thin layer of material is induced to cross-flow rapidly in both axial directions as the said material is carried around the circumference of said stationary surface in one fixed direction and further characterized by feeding a gaseous material with the dough-like solid material into the carrier grooves which form a closed system and inducing the cross-flow of both material and gas through and out said attrition zone so as to discharge an aerated granule and still further characterized by attaining a rim speed sufficient to induce a cross-flow speed of the thin layer of material of over 200 feet per minute by grooves and corrugations having an angular pitch of up to 45 degrees to the rotor axis.

5. A milling apparatus comprising an inner rotor member mounted and driven so as to rotate within an outer concentric stationary member aligned on a common frame; said rotor member having a cylindrical rim surface parallel and closely spaced from the mating stator inner surface; said rotor rim having a ratio of axially measured width to diameter of approximately 1:4 to 1:10; said apparatus having a low-pressure worm feeder communicating with the space between rotor and stator through a port in the stator for presenting input material radially to carrier grooves arranged around the central portion of said rotor rim whereby said grooves may be positively filled despite the centrifugal force imparted to the material by the rim surface speeds, said speeds being on the order of from 500 to 2,000 feet per minute at rotor diameters ranging from 20 to 50 inches; said rotor carrier grooves forming contours in the central portion of the rotor rim pitched at an angle of less than 45 degrees with the axis and large enough to carry enough input material around the stator to supply the desired amount of cross-flow; angularly pitched fine corrugations on lands between said grooves and positioned adjacent said grooves whereby the action of said grooves and said corrugations generates in the material a layer of .004 inch to .016 inch thickness an axial cross-flow at speeds of from 200 to 1,000 feet per minute at rim surface speeds of from 500 to 2,000 feet per minute respectively; and whereby said carrier action of grooves carries material around the full periphery of the stator regardless of its diameter and these grooves plus the corrugations on the lands in between the grooves force the material in a cross-flow across the central feed portion of the rim surface to and through an axially narrow attrition-zone portion around the edge of said rotor rim, the feed-portion axial width having a ratio of from 1.5:1 to 9:1 with the attrition-zone axial width, so as to discharge a thin layer of material out said rotor edge around the full periphery.

6. In a milling apparatus of the class described a rotor formed from multiple disc-like cups having peripheral edges which form a portion of the rotor's rim surface and having disc-like walls plus inner sleeve surfaces forming supporting walls for said rim surface from the driving shaft; one or more pairs of said cups appropriately assembled so that the assembly forms a cylindrical rotor having a rim axial width to diameter ratio on the order of from 1:4 to 1:10, with inlet and outlet ports for cirlating a heat exchange medium through its interior.

7. In a milling apparatus of the class described a stator comprising a jacketed cylindrical ring with inner surface mating with a rotor rim surface and having grooves and fine corrugations across said inner surface in axial alignment; a central portion of said inner surface having grooves and edge portions having finer corrugations, said grooves being on the order of 4 per inch and the fine corrugations ranging from 8 to 150 per inch, with inlet and outlet ports for circulating heat transfer medium through said jacket.

References Cited in the file of this patent

UNITED STATES PATENTS

| | | |
|---|---|---|
| Re. 23,760 | Marshall | Dec. 29, 1953 |
| 2,723,422 | Marshall | Nov. 15, 1955 |
| 2,780,334 | Bernhardt | Feb. 12, 1957 |
| 2,857,144 | Gurley | Oct. 21, 1958 |
| 2,982,990 | Zomlefer | May 9, 1961 |
| 3,023,455 | Geier et al. | Mar. 6, 1962 |
| 3,025,565 | Doriat et al. | Mar. 20, 1962 |